United States Patent [19]

Ferguson

[11] Patent Number: 4,555,207
[45] Date of Patent: Nov. 26, 1985

[54] FLOATING NUT
[75] Inventor: Robert C. Ferguson, Bolton, Canada
[73] Assignee: Spar Aerospace Limited, Mississauga, Canada
[21] Appl. No.: 600,380
[22] Filed: Apr. 16, 1984
[51] Int. Cl.$^4$ .................................. F16B 37/00
[52] U.S. Cl. .................................. 411/366; 411/427
[58] Field of Search .......... 411/427, 337, 352, 366, 411/432; 403/13, 14

[56] References Cited
U.S. PATENT DOCUMENTS
4,367,591  1/1983  Hirabayashi .............. 403/13 X FOREIGN PATENT DOCUMENTS
490044  1/1930  Fed. Rep. of Germany ...... 411/427

Primary Examiner—Kenneth J. Dorner
Assistant Examiner—Adrian H. Whitcomb, Jr.
Attorney, Agent, or Firm—Fetherstonhaugh & Co.

[57] ABSTRACT

A torque transmitting mating component for a mating assembly which, during assembly, provides at least one degree of freedom of movement selected from radial, axial and angular movement comprises an outer member, an inner member and torque transmitting elements located between the outer and inner members. The outer member has a chamber extending inwardly from one end thereof which has a polygon-shaped cross-sectional configuration. The inner member is located within the chamber of said outer member and has external side faces which are arranged to provide a polygon-shaped cross-sectional configuration corresponding to that of the chamber. The inner member is substantially smaller than the opening and the outer member so as to provide a clearance gap between the side walls and the external side faces. The torque transmitting elements are mounted in the clearance gap and provide a torque transmitting interference between the external side faces and the side walls while permitting limited relative movement therebetween to provide at least one degree of freedom of movement of inner and outer members with respect to one another. One of the members is adapted to form a mating element which is self-aligning when being engaged with a complementary mating element of the mating assembly.

15 Claims, 7 Drawing Figures

FLOATING NUT

FIELD OF INVENTION

This invention relates to torque transmitting mating members such as nuts, and in particular, it relates to a torque transmitting mating component which will facilitate alignment of one mating element with respect to another.

PRIOR ART

Difficulty is frequently experienced in attempting to align a nut and a bolt. This difficulty is particularly acute when the alignment must be effected in a hostile environment such as outer space or under water where it is necessary to rely upon a remote manipulator for the purposes of achieving alignment.

When using a remote manipulator for the purposes of aligning mating components, it is frequently possible to bring the components into a position in which they are substantially aligned, however, only minor misalignment is required in order to prevent the take up of one threaded element with respect to the other.

When it is necessary to secure two bodies together that have been brought into proximity by remote means, there sometimes remains a residual mal-alignment, either radial or angular which could preclude proper engagement of their threaded mating surfaces. I have designed a torque transmitting mating component in the form of a floating nut or element which will serve to permit self-alignment of the axis of the mating components within predetermined boundaries, with retention of the ability to transmit torque through the components.

My torque transmitting mating component provides a substantial freedom of movement by placing a polygon-shaped inner member within a similar shaped socket of an outer member so as to provide a large clearance between the inner and outer polygon-shaped members. I then provide for the required torque transmission interaction by locating torque transmitting pins or balls at each apex of the outer polygon so sized as to provide clearance between the pins/balls and the adjacent polygon surfaces. The assembled clearances provide the desired float, radial, axial and angular, while subsequent rotation of one member with respect to the other will cause the clearance between the pins or balls and the polygon surfaces to be taken up resulting in the transmission of torque between the inner and outer member and through the pins or balls.

A controlled amount of axial float or flexibility to accommodate height variations in the mating structure is introduced by making allowance for axial movement of the outer member between predetermined stops. The inner and outer members may be spring loaded with respect to each other to provide a predetermined configuration prior to each mating engagement.

Prior to the application of torque to either the inner or the outer member, the clearance in the area of the pins or balls permits accommodation of angular misalignment.

SUMMARY OF INVENTION

According to one aspect of the present invention, a torque transmitting mating component for a mating assembly which includes a complementary mating element comprises an outer member having a socket extending inwardly from a first end thereof, said socket having side walls defining a polygon-shaped cross-sectional configuration, said socket having a longitudinal axis, an inner member mounted in said socket and being proportioned to be longitudinally, laterally and angularly movable with respect to the socket, at least a portion of said inner member having side faces arranged in a polygon-shaped external configuration corresponding to that of said socket, said inner member having a longitudinal axis, said polygon-shaped portion of the inner member being proportioned such that its side faces are spaced from the side walls of said socket to provide a gap therebetween which has a maximum width when the polygon-shaped configurations are aligned with one another and which is reduced in width in response to rotation of one said members with respect to the other, torque transmitting means mounted in said gap, said torque transmitting means being proportioned to permit lateral and angular displacement of said longitudinal axes and rotation of said members with respect to one another when said polygon-shaped configurations are aligned, said torque transmitting means also being proportioned to limit the rotational movement of said members with respect to one another to that which will reduce the width of the gap to a sufficient extent to cause the torque transmitting means to be clamped between the oppositely disposed faces of the polygon-shaped configuration of the inner member and socket thereby also limiting the lateral and angular displacement of the members with respect to one another, longitudinal stop means at each end of said socket for limiting the longitudinal displacement of said members with respect to one another, said longitudinal stop means including first stop means at said first end of said outer member and second stop means at a second end of said outer member, threaded mating means on one of said members adapted to threadedly engage said complementary mating element, such that, upon mating of the threads of the complementary mating element and said one member, said inner member is urged into engagement with said first stop means such that, said members are angularly inclined with respect to one another, a leading portion of said inner member will make the initial contact with said first stop means and subsequent threading of said threaded mating means and said complementary mating element into further engagement will tend to draw the trailing portion of the first end of the inner member into engagement with the first stop thereby serving to urge the longitudinal axis of the inner member toward alignment with the longitudinal axis of the outer member.

IN THE DRAWINGS

The invention will be more clearly understood with reference to the following detailed specification read in conjunction with the drawings wherein.

Figure 1:
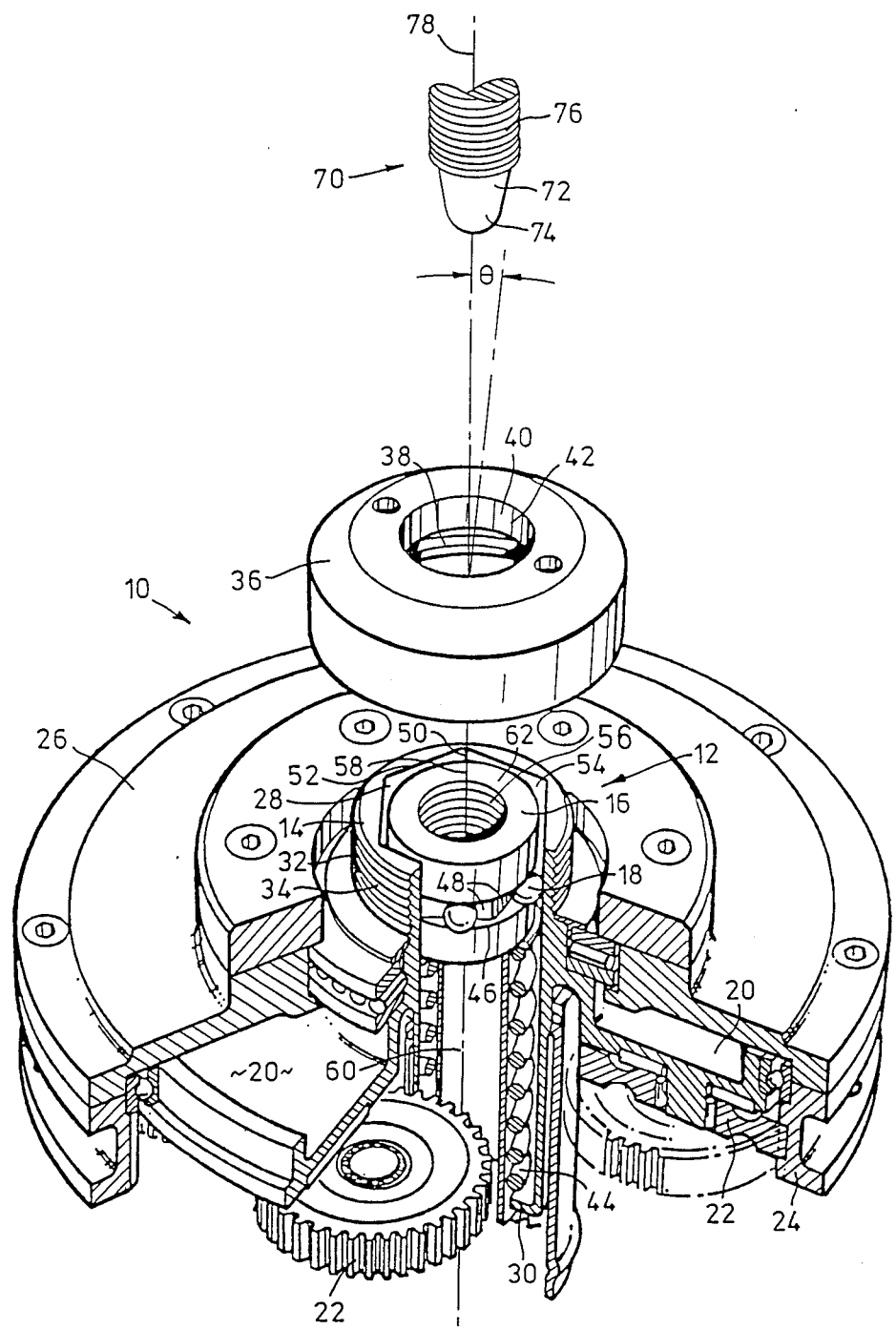
FIG. 1 is a partially sectioned pictorial view of a portion of a torque transmitting mating component constructed in accordance with an embodiment of the present invention.

With reference to FIG. 1 of the drawings, the reference numeral 10 refers generally to a portion of a torque transmitter which incorporates a torque transmitting mating component which is generally identified by the reference numeral 12 and which is constructed in accordance with an embodiment of the present invention.

The torque transmitting mating component 12 comprises an outer member 14, an inner member 16 and a plurality of torque transmitting balls 18. In the embodiment illustrated in FIG. 1 of the drawings, the outer member 14 has a flange portion 20 upon which planetary gears 22 are mounted for rotation. The gears 22 mesh with a ring gear 24. Gears 22 and 24 form a portion of the power transmission system used for rotatably driving the outer member 14 with respect to the housing 26. Various different forms of drive mechanisms may be provided for the purposes of driving the outer member 14 and consequently the drive mechanism illustrated in FIG. 1 will not be described in detail.

The outer member 14 has a hexagonal-shaped socket 28 opening inwardly from one end thereof. The socket 28 terminates in an inwardly directed flange 30 located at the other end thereof. A thread 32 is formed at the first end 34 of the outer member and a collar 36 is formed with a threaded bore 38 adapted to threadedly engage the threaded end 32. A shoulder 40 extends inwardly from the collar 36 and has a passage 42 opening therethrough. The shoulder 40 forms a first stop at the first end 34 of the outer member which prevents direct removal of the inner member 16 from the socket 28. A coil spring 44 extends between the inner end of the inner member 16 and the flange 30 and serves to normally urge the inner member 16 into engagement with the shoulder 40 of the collar 36.

The inner member 16 has a circumferentially extending recess 46 located substantially centrally of its length. The base of the recess is formed with a plurality of side faces 48 arranged in a hexagonal-shaped external configuration corresponding to and smaller than the hexagonal configuration of the socket 28. The oppositely disposed side walls of the recess 46 are spaced from one another a sufficient distance to receive balls 18 therebetween and serve to retain the balls 18 against longitudinal movement with respect to the inner member 16. One ball 18 is provided for each apex 50 of the polygon configuration of the side walls 52 of the socket 28. As will be described hereinafter in more detail with reference to FIGS. 2 and 4 of the drawings, the gap 54 which is formed between the side faces 48 of the inner member and the side walls 52 of the socket has a maximum width when the polygon-shaped configurations are aligned with one another and is reduced in width in response to rotation of the inner member with respect to the outer member.

A threaded bore 56 is formed in the inner member 16 and has a longitudinal axis 58. When the torque transmitting mating component 10 is not in use, the compression spring 44 will normally serve to urge the flat end face 62 of the inner member 16 against the shoulder 40, thereby serving to align the axis 58 of the bore 56 with the axis 60 of the socket 28.

In use, the torque transmitting mating component 12 mates with a complementary component 70 in the form of a pin 72 which has an elongated tapered nose portion 74 and a threaded body portion 76. The pin 72 has a longitudinal axis 78 about which the threads of the threaded body portion 76 are generated. The elongated tapered nose portion 74 is proportioned such that at its leading end, it is substantially smaller in diameter than the threaded bore 56 of the inner member 16.

If the complimentary component 70 is introduced to the mating component 12 with the longitudinal axis 78 of the pin 72 angularly inclined with respect to the longitudinal axis 58 at an angle $\theta$ and the centre of the distal end of the pin 72 laterally offset with respect to the axis 58, it will be necessary to cause the inner member 16 to be angularly and laterally displaced to permit mating of the threaded body portion 76 of the pin with the threaded bore 56 of the inner member. In use, as the elongated nose portion 74 enters the bore 56 and engages a side wall of the bore 56, the gap which is formed between the inner member and the socket will permit the inner member 16 to move laterally and angularly so as to align the axis 58 of the bore 56 with the axis 78 of the pin. If the axis 58 is displaced so as to be angularly inclined with respect to the axis 60 of the socket, the end face 62 of the inner member 16 will extend in a plane which is angularly inclined with respect to the plane of the shoulder 40 of the collar 36. When the outer member 14 is rotatably driven, it will rotate relative to the inner member 16 until the gap formed between the side walls of the socket and the side faces of the inner member is reduced to an extent sufficient to cause the balls 18 to be clamped therebetween such that further rotation of the outer member will cause the inner member to rotate thereby threadedly engaging the threaded bore 56 and threaded body portion 76. As the inner member 16 is threaded onto the pin 72, it will be drawn toward the shoulder 40. Because the end face 62 of the inner member 16 is angularly inclined with respect to the shoulder 40, the end face 62 will present a leading edge portion toward the shoulder 40 and when this leading end portion is drawn against the shoulder 40 as a result of the threading of the pin 72 into the bore 56, the load applied therebetween will tend to urge the axis 58 and the axis 78 with which it is aligned toward alignment with the axis 60 of the bore. Thus, not only does the inner member 16 act as a self-aligning and self-centering mating element, it also serves to draw the mating components into alignment with one another. By compressing the spring 44, the inner member 16 may move longitudinally with respect to the socket 28 to accommodate longitudinal misalignment between the pins of a set of pins 72 and the inner members 16 of a set of torque transmitting mating components. That is to say if one pin 72 of a set of pins projects in advance of any of the other pins of the set, while all of the inner members of a set of torque transmitting mating components are coplanar, the longitudinal displacement of the inner member will accommodate the longitudinal misalignment of the pins.

Figure 2:
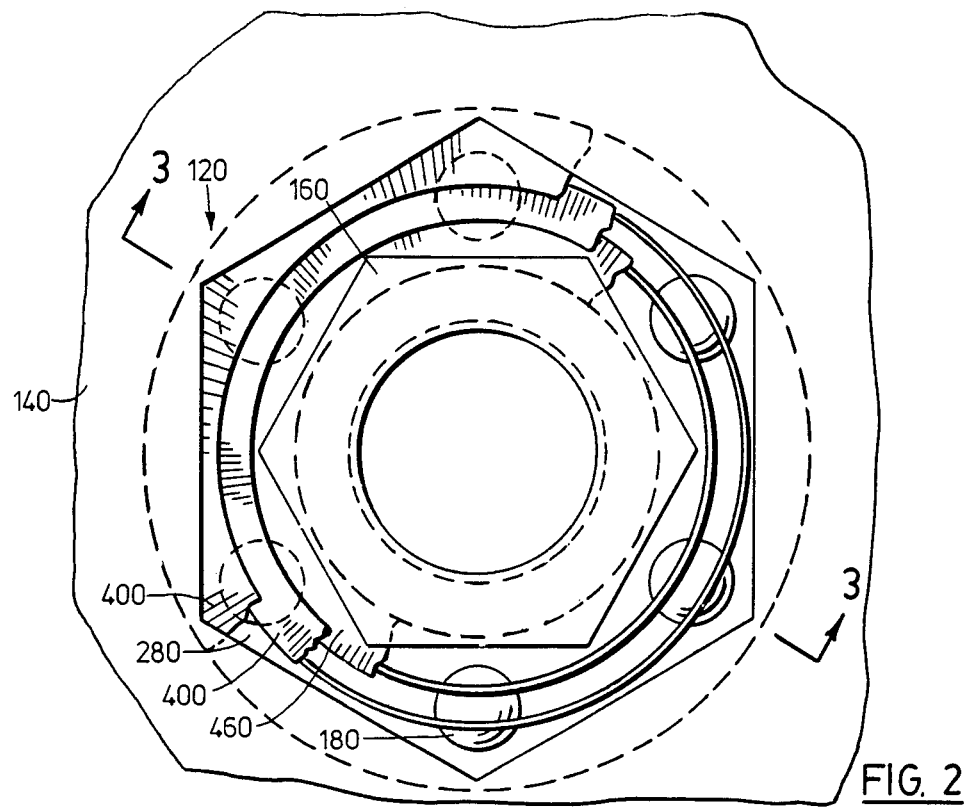
FIG. 2 is a plan view of a simplified torque transmitting mating component constructed in accordance with a further embodiment of this invention.
Figure 3:
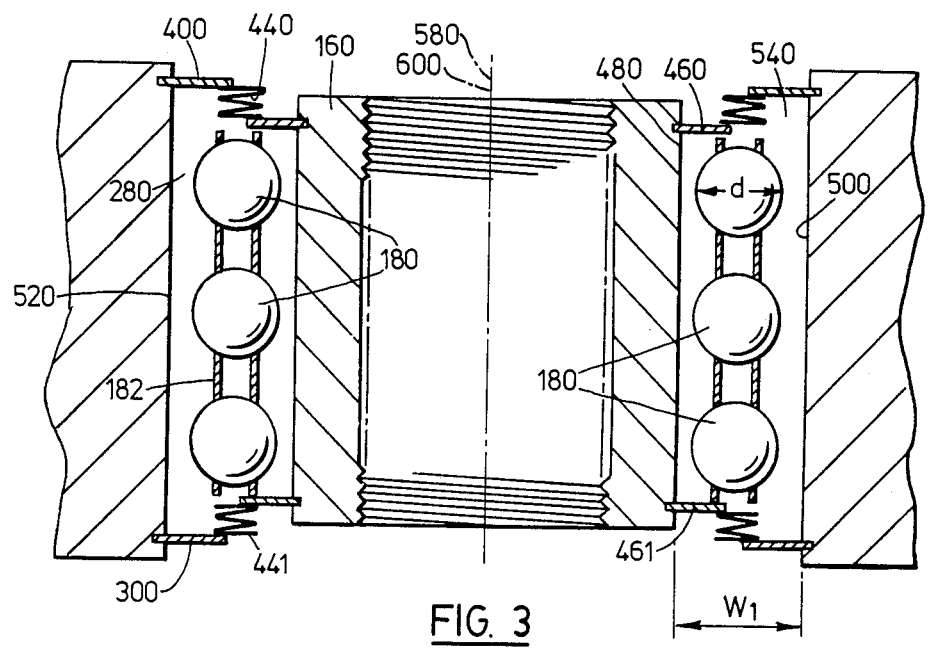
FIG. 3 is a cross-sectional side view taken along the line 3—3 of FIG. 2.

Various modifications of the structure of the torque transmitting mating component of FIG. 1 will be apparent to those skilled in the art. One such modification is illustrated in FIGS. 2 to 6 of the drawings in which the reference numeral 120 refers generally to a torque transmitting mating component which comprises an outer member 140, an inner member 160 and a plurality of torque transmitting balls 180. A hexagonal-shaped socket 280 is formed in the outer member 140. Upper and lower retaining rings 400 and 300 project radially inwardly from the side walls 520 of the hexagonal-shaped socket 280. The inner member 160 is in the form of a hexagonal-shaped nut having side faces 480. Retaining rings 460 and 461 project radially outwardly from the inner member 160. Compression springs 440 and 441 are located between retaining rings 400 and 460 and 300 and 461, respectively. The torque transmitting balls 180 are circumferentially and longitudinally spaced from one another by means of a cage 182 and are proportioned to have a diameter "d" which is substantially less than the width W1 of the gap 540. The width W1 is the maximum width of the gap 540 which condition exists when each apex 500 of the socket 280 is positioned centrally of the width of the side faces 480 of the inner member 160. This position is shown in FIGS. 2 and 3 of the drawings and it will be apparent that when in this position the inner member 160 may be angularly, laterally or longitudinally displaced with respect to the outer member 140 to the limit of travel permitted by the available clearances between the balls 180, side faces 480, side walls 520 and retaining rings 400,460 and 300,461.

Figure 4:
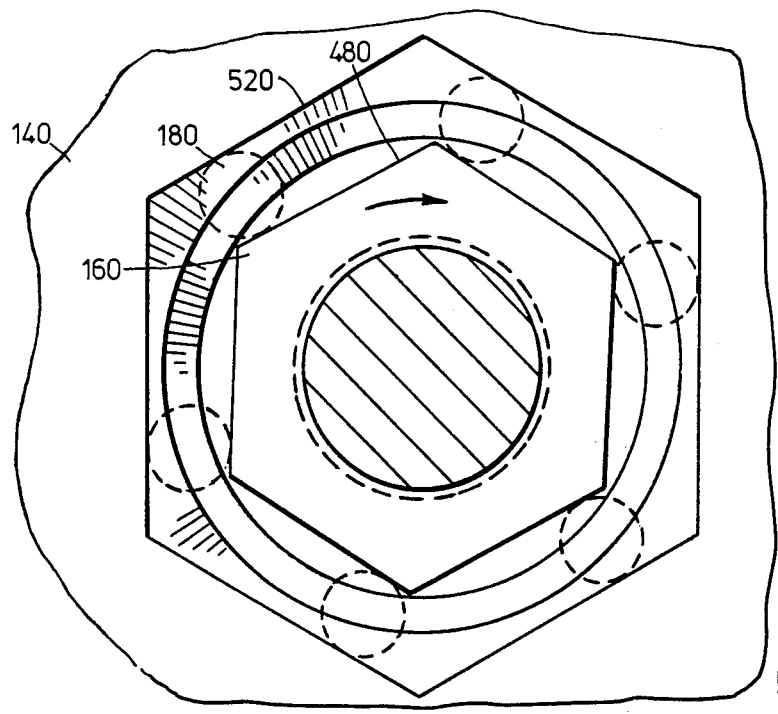
FIG. 4 is a plan view similar to FIG. 2 showing the inner member in torque transmitting engagement with the outer member.
Figure 5:
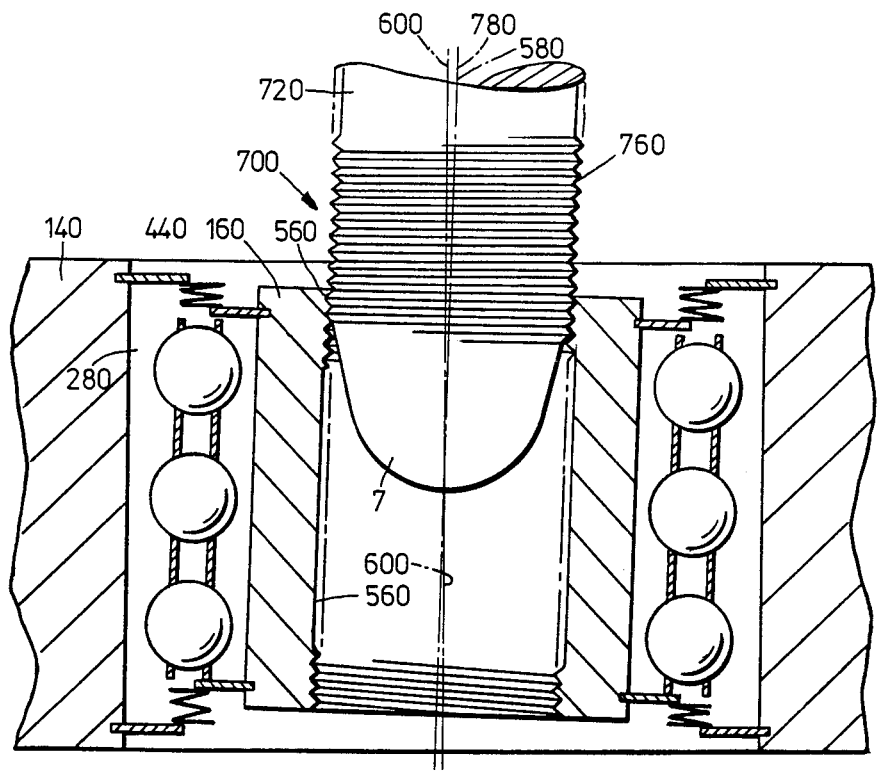
FIG. 5 is a sectional view similar to FIG. 3 showing angular displacement of the inner member with respect to the outer member to accommodate a misaligned complementary threaded component.
Figure 6:
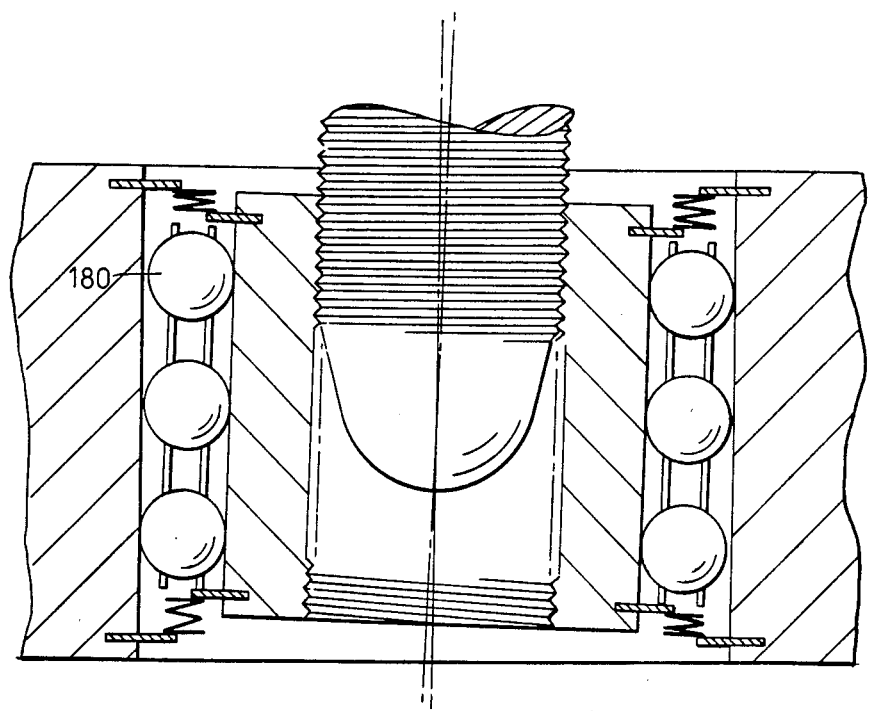
FIG. 6 is a view similar to FIG. 4 showing the effect of further penetration, and, FIG. 7 is a sectional view similar to FIG. 5 showing a structure in which the torque transmitting elements are in the form of rollers.

As illustrated in FIGS. 4 and 5 of the drawings when a complimentary component 700 in the form of a pin 720 enters the threaded bore 560 with its longitudinal axis 780 angularly inclined with respect to the longitudinal axis 580 of the socket 280, the inner member 160 will be angularly displaced to align its axis 600 with the axis 780 of the pin. If the outer member 140 or the pin 720 is then rotatably driven, the inner member 160 will be displaced relative to the outer member 140 as indicated in FIG. 4 of the drawings until the torque transmitting balls 180 become clamped between the side faces 480 and the side walls 520 after which torque may be transmitted between the outer end members through the torque transmitting balls 180. When the threaded body 760 of the pin 720 engages the threaded bore 560, the inner member 160 will be drawn toward the pin 720 and because of the fact that the inner member 160 is angularly inclined with respect to the outer member 140, the spring 440 will be subjected to an uneven compression. This will result in an uneven load being applied to the inner member 160 tending to urge the inner member 160 to return to axial alignment with the outer member which in turn tends to urge the pin 720 to a position in which its axis 780 is aligned with the axis 600.

In applications where the torque which is to be transmitted is relatively low, the single row of torque transmitting balls may be provided and in applications where higher torque transmission is required, the multiple rows of balls 180 may be provided as shown in FIG. 3. A greater amount of angular displacement is available when a single row of balls is provided, thus, when obtaining a greater degree of angular displacement, it is necessary to give up a portion of the torque transmitting capacity of the assembly.

Figure 7:
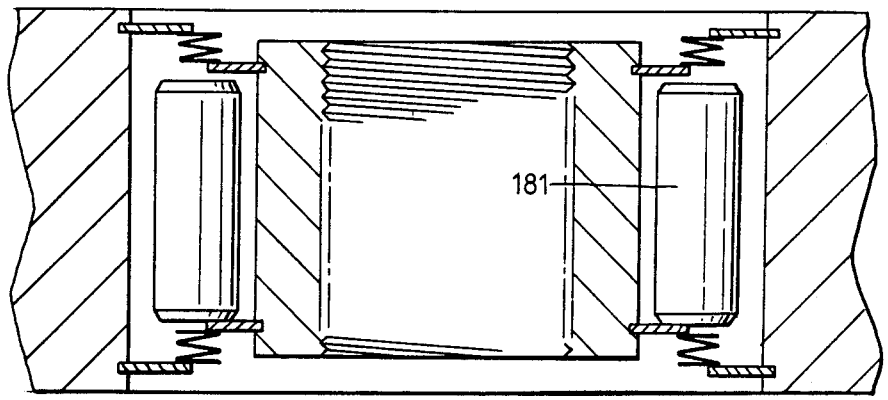

A further modification of the present invention is illustrated in FIG. 7 of the drawings wherein the torque transmitting balls 180 are replaced by rollers 181. The rollers 181 function in the same manner as the torque transmitting balls 180 and have the advantage of providing a greater surface area for torque transmission purposes.

Various other modifications of the structure of the present invention will be apparent to those skilled in the art.

I claim:

1. A mating component for a mating assembly which, during assembly, provides at least one degree of freedom of movement selected from radial, axial and angular movement comprising;
   (a) an outer member having a chamber extending inwardly from one end thereof, said chamber having side walls which are arranged such that the chamber has a polygon-shaped cross-sectional configuration,
   (b) an inner member located within said chamber of said outer member and having external side faces which are arranged to provide a polygon-shaped cross-sectional configuration corresponding to that of said chamber, said inner member being substantially smaller than said chamber and said outer member so as to provide a clearance gap between said side walls and external side faces,
   (c) torque transmitting means mounted in said clearance gap to provide a torque transmitting interference between said external side faces and said side walls while permitting limited relative movement therebetween to provide at least one degree of freedom of movement of said members with respect to one another,
   (d) one of said members being adapted to form a mating element which is self-aligning when being engaged with a complimentary mating element of said mating assembly.

2. A mating component for a mating assembly comprising;
   (a) an outer member having a polygon-shaped socket formed therein, said socket having a longitudinal axis,
   (b) an inner member at least a portion of which has a polygon-shaped external configuration, corresponding to that of said socket, said inner member having a longitudinal axis and being located within said socket of said outer member and being proportioned such that its polygon-shaped portion is spaced from the walls of said socket to provide a clearance gap therebetween which has a maximum radial extent when the polygon-shaped portion of the socket and the inner members are aligned with one another,
   (c) torque transmitting means mounted in said clearance gap, said torque transmitting means being proportioned to be smaller than the gap so as to permit rotation of said members relative to one another between a first position in which the clearance gap permits a limited amount of freedom of movement of one member with respect to the other to provide at least one degree of freedom of movement and a second position in which the torque transmitting means engages both of said members and locks them together to permit torque transmission therebetween,
   (d) one of said members being adapted to form a mating element which, by virtue of the freedom of movement provided when said members are in said first position, is self-aligning with a complimentary mating element of said mating assembly in use.

3. A torque transmitting mating component for a mating assembly which includes a complimentary mating element, said component comprising;
   (a) an outer member having a socket extending inwardly from a first end thereof, said socket having side walls defining a polygon-shaped cross-sectional configuration, said socket having a longitudinal axis, (b) an inner member mounted in said socket and being proportioned to be longitudinally, laterally and angularly movable with respect to the socket, at least a portion of said inner member having side faces arranged a polygon-shaped external configuration corresponding to that of said socket, said inner member having a longitudinal axis, said polygon-shaped portion of the inner member being proportioned such that its side faces are spaced from the side walls of said socket to provide a gap therebetween which has a maximum width when the polygon-shaped configurations are aligned with one another and which is reduced in width in response to rotation of one said members with respect to the other, (c) torque transmitting means mounted in said gap, said torque transmitting means being proportioned to permit lateral and angular displacement of said longitudinal axes and rotation of said members with respect to one another when said polygon-shaped configurations are aligned, said torque transmitting means also being proportioned to limit the rotational movement of said members with respect to one another to that which will reduce the width of the gap to a sufficient extent to cause the torque transmitting means to be clamped between the oppositely disposed faces of the polygon-shaped configuration of the inner member and socket thereby also limiting the lateral and angular displacement of the members with respect to one another, (d) longitudinal stop means at each end of said socket for limiting the longitudinal displacement of said members with respect to one another, said longitudinal stop means including first stop means at said first end of said outer member and second stop means a second end of said outer member, (e) threaded mating means on one of said members adapted to threadedly engage said complimentary mating element, such that upon mating of the threads of the complimentary mating element and said one member, said inner member is urged into engagement with said first stop means such that, said members are angularly inclined with respect to one another, a leading portion of said inner member will make the initial contact with said first stop means and subsequent threading of said threaded mating means and said complimentary mating element into further engagement will tend to draw the trailing portion of the first end of the inner member into engagement with the first stop thereby serving to urge the longitudinal axis of the inner member toward alignment with the longitudinal axis of the outer member.

4. A torque transmitting mating component as claimed in claim 3 wherein said torque transmitting means comprises a plurality of balls arranged one between each opposed side face of said socket and inner member.

5. A torque transmitting mating component as claimed in claim 3 wherein said torque transmitting means comprises a plurality of cylindrical-shaped rollers each of which has a longitudinal axis, said rollers being arranged one between each opposed side face of said socket and said inner member.

6. A torque transmitting mating component as claimed in claim 4 wherein one of said members is formed with a groove extending about its periphery in the area of its polygon-shaped portion, said groove being proportioned to receive and retain said balls against longitudinal movement out of engagement with said members.

7. A torque transmitting mating component as claimed in claim 3 wherein said torque transmitting means has a width extending in the direction of the width of said gap which is less than the maximum width of said gap.

8. A torque transmitting mating component as claimed in claim 3 wherein said first and second stop means is respectively a first and second shoulder extending inwardly from the side walls of said socket, and wherein spring means is mounted between and bears against said inner member and said first and second shoulders respectively, said spring means being adapted to urge the inner member toward alignment with said socket.

9. A torque transmitting mating component as claimed in claim 3 wherein said socket is substantially longer than said inner member thereby to provide longitudinal movement of said inner member with respect to said socket.

10. A torque transmitting mating component as claimed in claim 4 wherein said balls are arranged in a single circumferentially extending row whereby the angular displacement of the inner member with respect to the socket is achieved by rotation about an axis of each ball.

11. A torque transmitting mating component as claimed in claim 4 wherein the balls are arranged in a plurality of circumferentially extending rows which are longitudinally spaced along the length of the socket.

12. A torque transmitting mating component as claimed in claim 5 wherein the cylindrical rollers are longitudinally elongated so as to provide a substantial contacting surface area for transmitting torque between the inner member and the socket.

13. A torque transmitting mating component as claimed in claim 3 wherein said polygonal-shaped configuration of the inner member and the socket is in the form of a hexagon.

14. A torque transmitting mating component as claimed in claim 4 wherein said balls are arranged one at each apex of the polygon-shape of said socket.

15. A torque transmitting mating component as claimed in claim 4 wherein one of said cylinder shaped rollers is located at the apex of the polygon-shape of the socket.

* * * * *